(12) United States Patent
Byun (10) Patent No.: US 6,470,625 B1
(45) Date of Patent: Oct. 29, 2002

(54) SEEDLING RAISING DEVICE FOR AERIAL SEED COLLECTION OF FARM PRODUCTS

(76) Inventor: Bok Koo Byun, 949-1 Siheung-dong, Keumcheon-ku, Seoul (KR)

(*) Notice: Subject to any disclaimer, the term of this patent is extended or adjusted under 35 U.S.C. 154(b) by 0 days.

(21) Appl. No.: 09/661,742

(22) Filed: Sep. 12, 2000

(30) Foreign Application Priority Data

Sep. 13, 1999 (KR) .............................................. 99-39102

(51) Int. Cl.⁷ .............................................. A01G 25/00
(52) U.S. Cl. ...................................................... 47/82
(58) Field of Search .......................... 47/66.5, 79, 82, 47/83, 87, 39

(56) References Cited

U.S. PATENT DOCUMENTS

| | | | |
|---|---|---|---|
| 4,124,953 A | | 11/1978 | Patton ............................ 47/66 |
| 4,250,666 A | * | 2/1981 | Rakestraw ...................... 47/83 |
| 4,419,843 A | | 12/1983 | Johnson, Sr. ................... 47/82 |
| 4,736,543 A | | 4/1988 | von Bertab Erdmann ...... 47/82 |
| 5,309,671 A | | 5/1994 | Byun ............................. 47/83 |
| 5,428,922 A | * | 7/1995 | Johnson ......................... 47/82 |
| 5,533,302 A | * | 7/1996 | Lynch et al. ................... 47/82 |
| 5,615,519 A | * | 4/1997 | Abe et al. ...................... 47/59 |

FOREIGN PATENT DOCUMENTS

IT 0301362 A1 * 1/1989 ................... 47/82

* cited by examiner

Primary Examiner—Charles T. Jordan
Assistant Examiner—Francis T. Palo (57) ABSTRACT

In the seedling raising device for an aerial seed cultivation of plants, which is capable of aerially cultivating offspring plants, a specific seedling raising plate of a suspending type, and watering and drainage devices, are set in a cultivating receptacle to increase the number of the offspring plants per a cultivation area; nutrient solution is separately supplied to cultivating units through a drip irrigator such that the respective mother plant cultivating units are separated from one another, thereby reducing the infection rate of blight and preventing one mother plant from being infected by another mother plant, thus improving productivity of the plants and largely increasing the number of the offspring plants.

4 Claims, 8 Drawing Sheets

SEEDLING RAISING DEVICE FOR AERIAL SEED COLLECTION OF FARM PRODUCTS

BACKGROUND OF THE INVENTION

1. Field of the Invention

The present invention relates to a seedling raising device capable of cultivating the offspring of vegetable plants or flowering plants, such as strawberry plants, in an elevated structure in which the number of seedlings in a cultivation area is increased and water-borne infectious diseases such as anthracnose can be prevented.

2. Description of the Prior Art

Traditional methods for cultivating annual plants easily destroyed by blight, such as strawberries, generally involve raising seedlings in a controlled indoor environment and then transplanting the seedlings outdoors after sufficient growth. The growth enables the plant to increase its resistance to blight, thus increasing crop yield.

The traditional methods, however, require intensive labor in raising the seedling and then transplanting it for further growth. These methods also leave the plants vulnerable to water-borne diseases such as anthracnose, More recently, methods have been developed in which plants are raised in an elevated soil bed to which a separate nutrient solution is provided. Horizontally arrayed seedling raising plates are incorporated into the structure. Plants grow in the elevated soil bed and offspring shoots of the plants are planted in the seedling raising plates. This method prevents the plants from being infected with the water-borne infectious diseases found in the open field.

However, as compared to cultivation in open fields, these elevated devices generally do not increase the number of offspring shoots that can be cultivated. Furthemore, if the mother plant is infected with a waterborne infection, the daughter plants will be likewise infected. Thus, the damage possible in using these prior art methods and devices can be very serious requiring the soil bed to be wholly replaced and a new mother plant planted. Such a remedy is inconvenient, costly, and complicated.

SUMMARY OF THE INVENTION

It is, therefore, a primary object of the present invention to provide a seedling raising device for the elevated cultivation of plants, in which a separate seedling raising plate is elevated and watering and drainage devices are incorporated in a standing cultivating structure, which is disclosed in Utility Model No. 27267. This device increases the number of offspring plants in a cultivation area. By separately supplying the nutrient solution to the seedling rising plates, the blight infection rate is reduced, thus increasing crop yield. Further, the number of offspring plants is increased because blight does not spread from one mother plant to another.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to be preferred embodiments of the present invention, examples of which are illustrated in the accompanying drawings.

Figure 1:
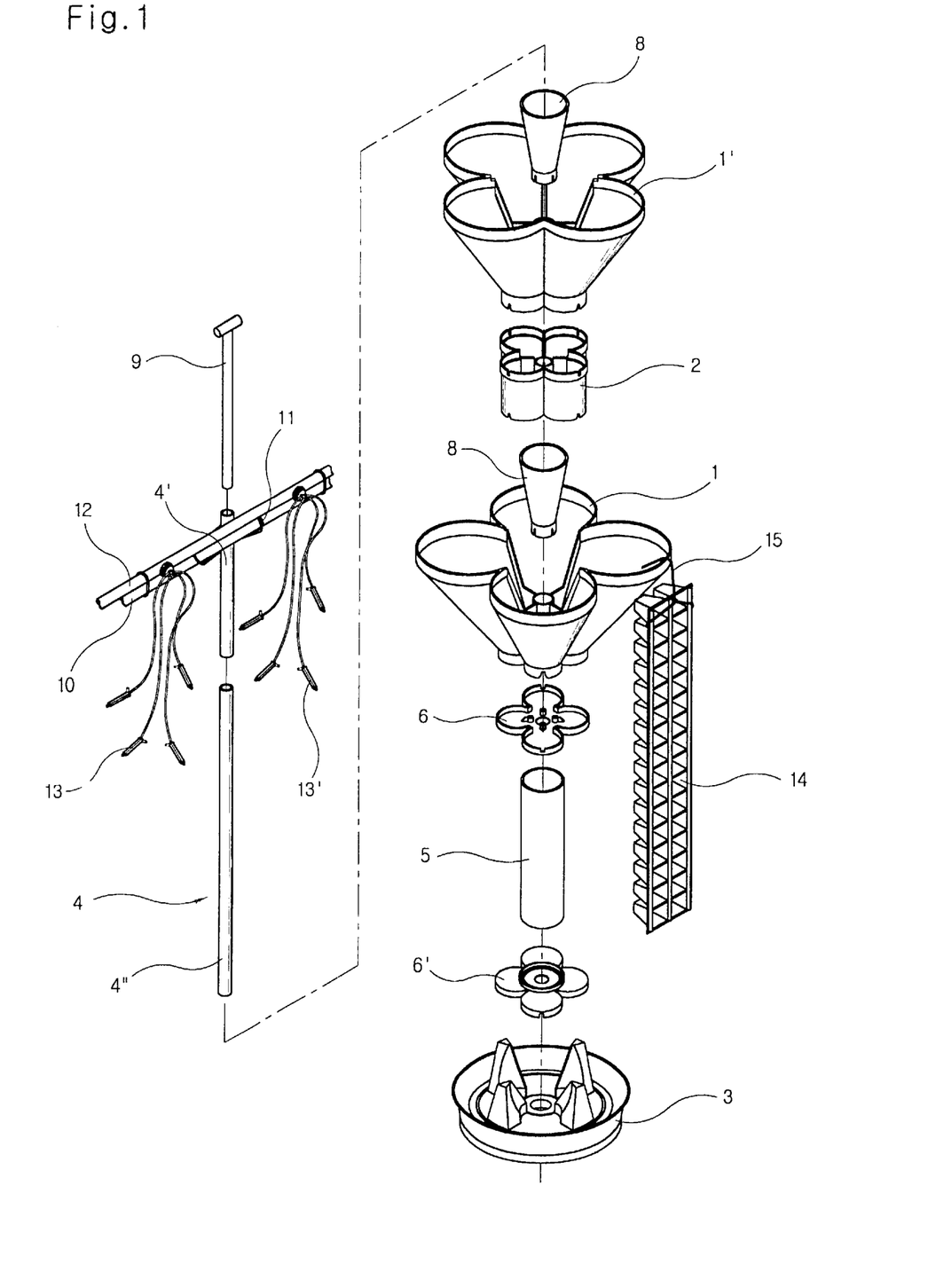
FIG. 1 depicts a separate perspective view in accordance with the present invention.
Figure 2:
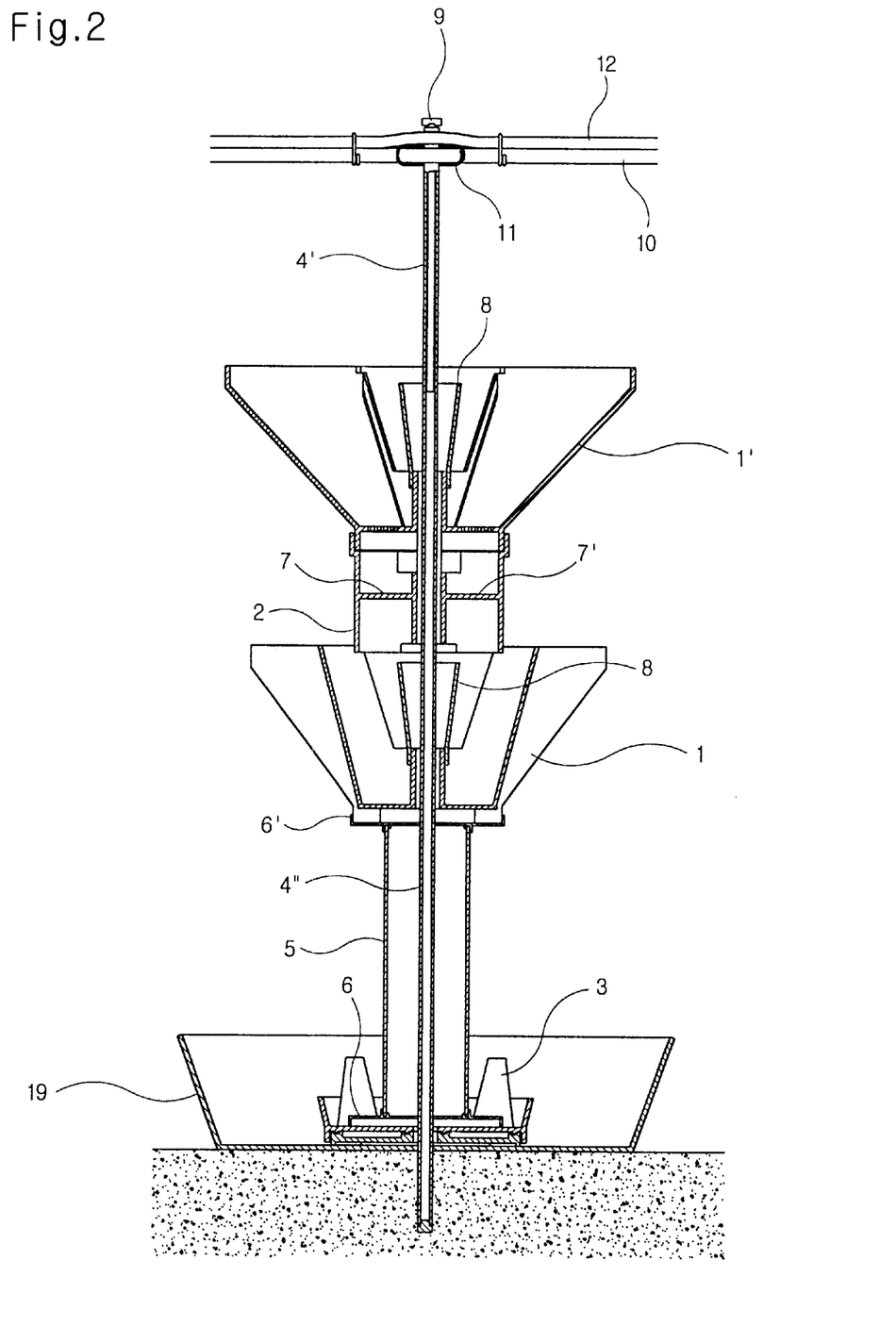
FIG. 2 illustrates a side sectional view of a seedling raising device in accordance with the present invention.

FIG. 1 is a separately perspective explanatory view of an aerially seedling raising device and FIG. 2 is its side sectional explanatory view, in accordance with the present invention.

Figure 7:
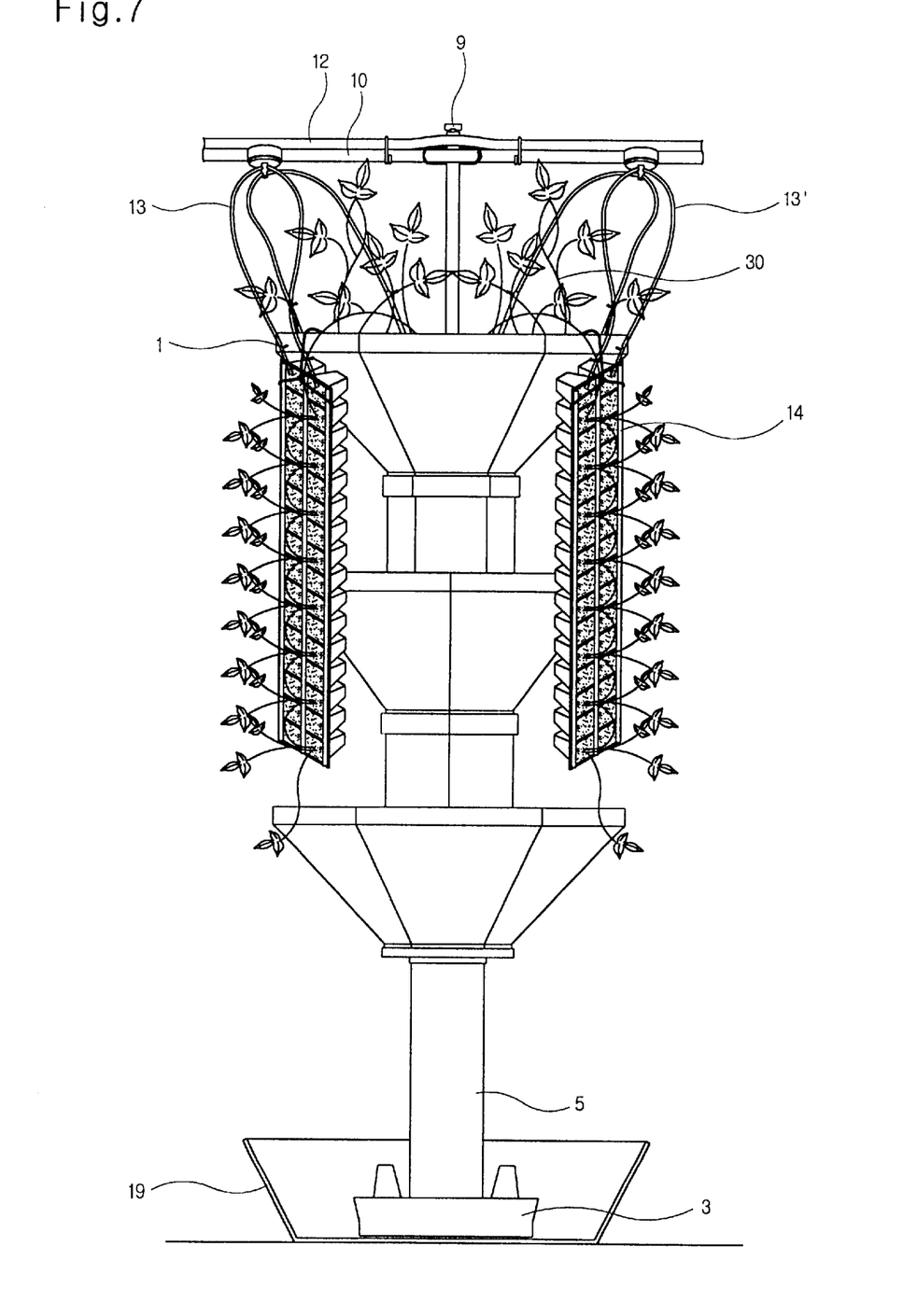
FIG. 7 provides a using state view of the inventive seedling raising device.
Figure 8:
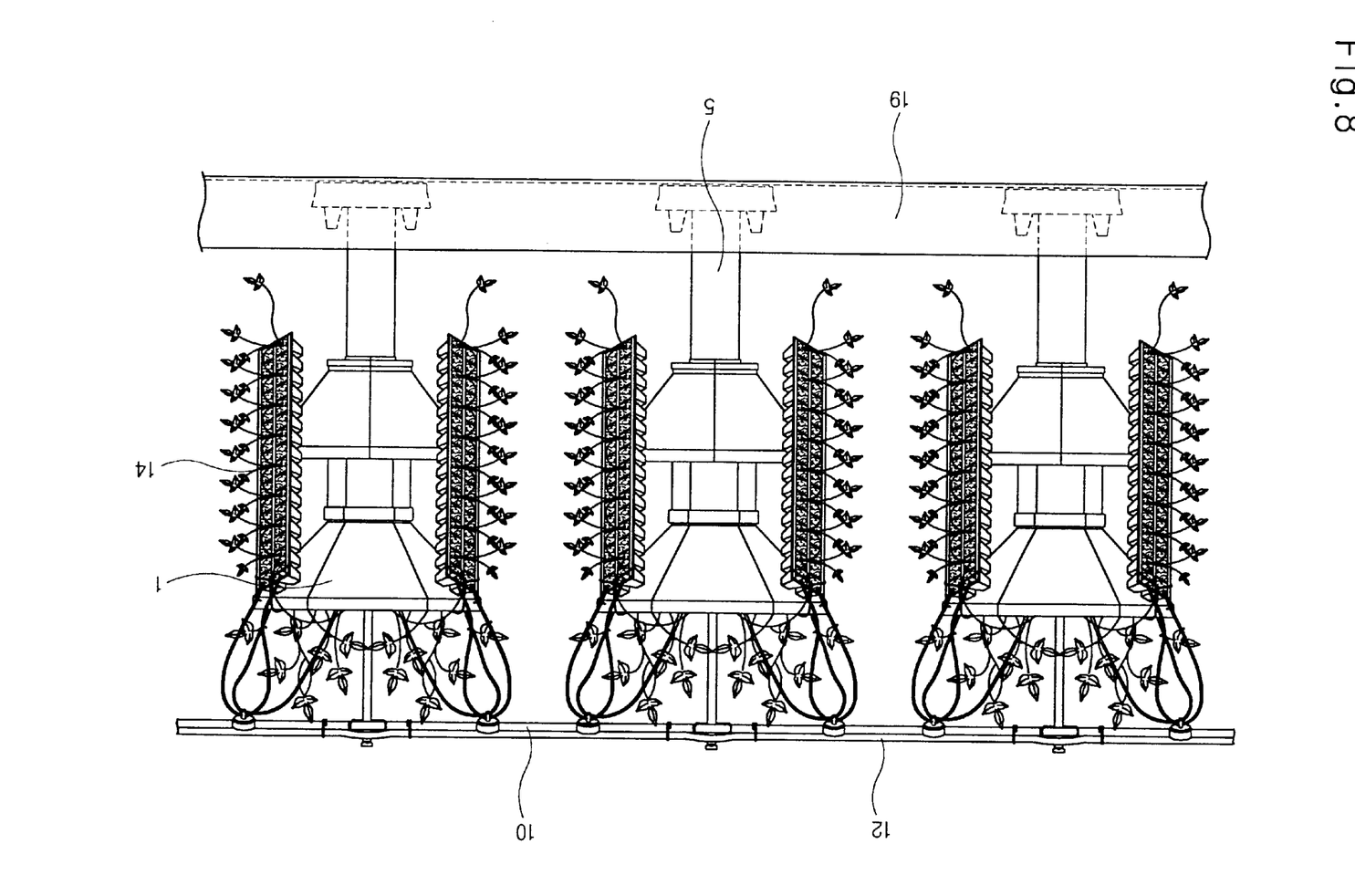
FIG. 8 furnishes an installment state view in accordance with the present invention.

In accordance with the present invention and as shown in FIGS. 1 and 7, a seedling raising device for an aerial seed cultivation of plants is constructed in a cultivating receptacle incorporating general aerial cultivating units 1, 1', an interval maintained 2 and a rotary prop 3, the inside of which has an insertion of a pipe body 4. A drainage pipe 5 is inserted between the aerial cultivating unit 1 and the rotary prop 3, both ends of the drainage pipe 5 hating an insertion of backing plates 6, 6' as shown in FIG. 5b to thus fix the drainage pipe 5, the aerial cultivating unit 1 and the rotary prop 3; the interval maintained 2 has upper/lower part shielding bulkhead 7, 7' formed in the inside thereof and a water collecting tub 8 is inserted between the interval maintained 2 and the aerial cultivating units 1, 1'; a support pipe 10 is fixed onto an upper part of the pipe body 4 through a use of a clip 11, and an irrigating hose 12 is fixed to the support pipe 10, wherein the irrigating hose 12 is connected with a plurality of drip irrigators 13, 13'; and a separate raising-seedling plate 14 is set, suspended from the aerial cultivating unit 1 by a hook 15, and an exhausting vessel 19 having a plate-bonding shape is installed in a lower face of the rotary prop 3.

Figure 5A:
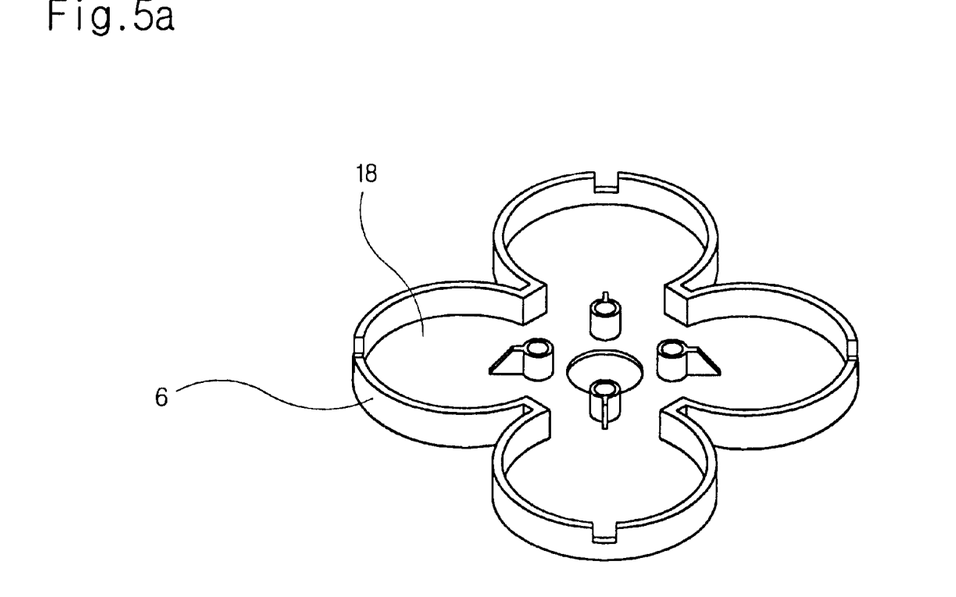
FIG. 5a presents an upper portion perspective view of a backing plate in the invention.
Figure 5B:
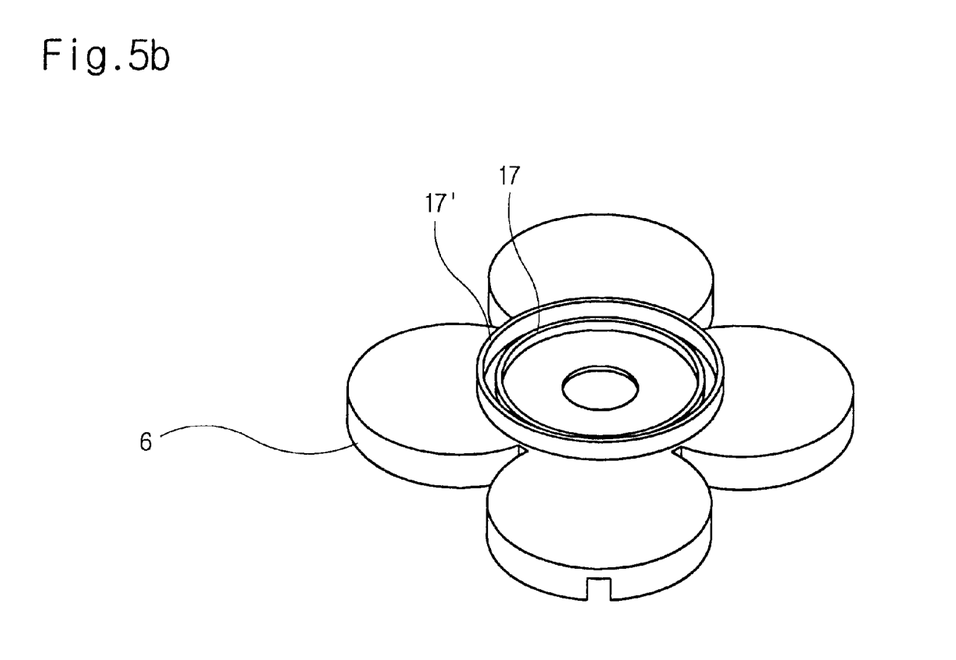
FIG. 5b represent a lower portion perspective view of the inventive backing plate.
Figure 6:
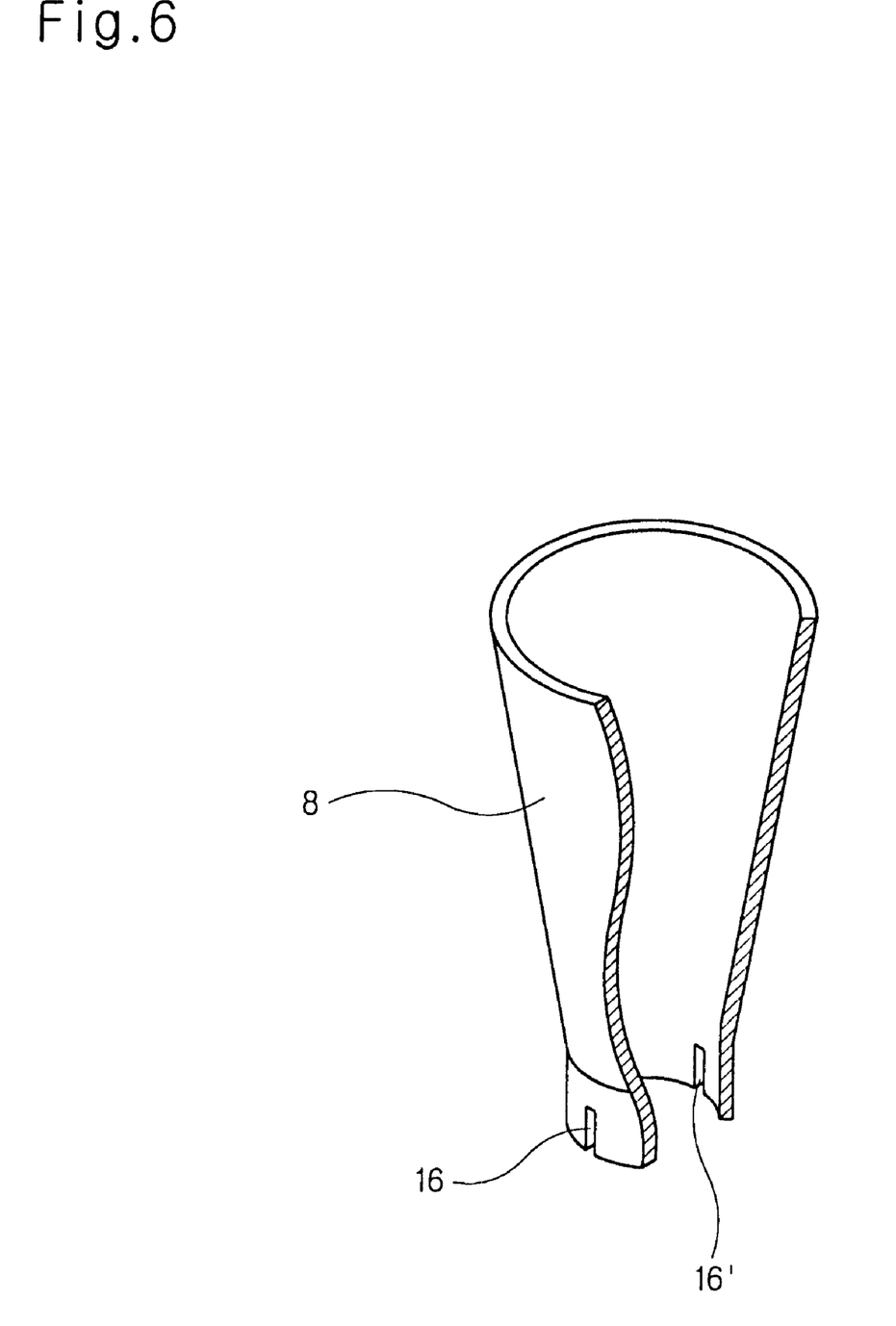
FIG. 6 shows a partially cut perspective view of a water collecting tub in the present invention.

In one side face of a backing plate 6, 6' an inner/outer double jaw 17, 17' is formed and the drainage pipe 5 is inserted therebetween, and in another side face thereof, a concave part 18 as shown in FIG. 5a may be formed so that a lower part of the serial cultivating unit 1, 1' is safely set thereinto. The collecting-water tub 8 is formed by a funnel shape, namely, an upper-wide and lower-narrow shape, and its lower portion has a plurality of insertion concave flutes 16, 16'. The pipe body 4 is divided into upper and lower bodies 4', 4", and an upper end part of the upper body 4' has an insertion of a rotary support rod 9, one end of which is formed longer than a boundary section of the upper and lower bodies 4', 4" that the pipe upper body 4' is rotatable when the rotary support rod 9 is lifted up and is rotated.

Non-explained referenced No. 30 in FIG. 7 represents a mother plant.

The inventive operations with such construction is described in detail as follows, with reference to the accompanied drawings.

The device of the present invention is installed, as shown in the Figures, by assembling the elements as follows: lower body 4" is inserted through vessel 19, which has been placed in the cultivation area, to a given depth. Rotary prop 3, backing plate 6'. Shown in FIGS. 5*a* and 5*b*, drainage pipe 5, water collecting tub 8, interval maintainer 2, aerial cultivating unit 1', water collecting tub 8, are then assembled in that order and pipe body 4 is threaded into trough the elements.

The height of cultivating units 1, 1' can be controlled by varying the length of the drainage pipe 5 and the pipe lower body 4". The number of cultivating units may be increased by adding additional groupings of interval maintainer 2, collecting vat tub 8, and aerial cultivating unit 1.

An alternative embodiment is the seedling raising device supported only by the backing plate without the rotary prop 3. This is accomplished by attaching backing plate 6 directly to the upper part of vessel 19.

The function of vessel 19 is to collect nutrient solution flowing downwards and both ends of vessel 19 are provided with nozzles not shown in the drawing, to discharge the nutrient solution gather in vessel 19.

Pipe upper body 4' is inserted into pipe lower body 4". The rotary support rod 9 is inserted into pipe upper body 4', thus supporting pipe 4. An upper end part of pipe upper body 4' is fixed by a clip 11 and a support pipe 10 fixed to the cultivation equipment. The support pipe 10 is also combined with an irrigating hose 12 and a plurality of drip irrigators 13, 13' are connected thereto. A seedling railing plate 14 having a plurality of seedling raising chambers is hung by hook 15 from the edges of cultivating units 1, 1'.

Figure 3:
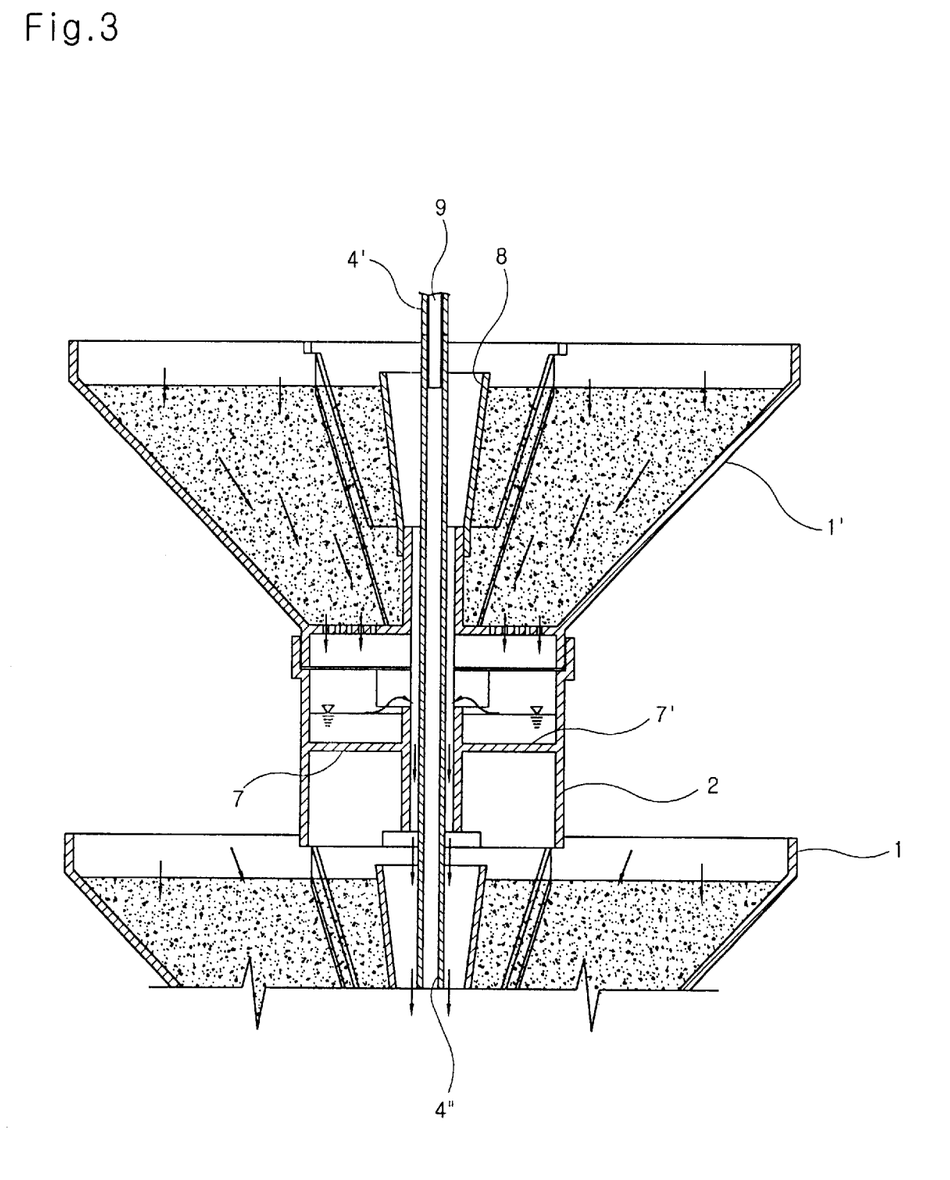
FIG. 3 sets forth a partially enlarged sectional explanatory view of the inventive seedling raising device.

FIG. 3 is a partially enlarged side sectional view showing a flowing of the nutrient solution in the inventive seedling raising device, In FIG. 3, the nutrient solution is supplied from the drip irrigators 13, 13' not shown in the drawing. This nutrient solution soaks through the lower part of the soil bed held in cultivating unit 1', supplying nourishment and moisture to the roots of a mother plant 30. The remainder of the nutrient solution flows through the lower part of cultivating unit 1' and reaches bulkheads 7, 7' of interval maintainer 2, A constant quantity is then gathered by a jaw, and in case a quantity more than the constant quantity flows in, the nutrient solution overflows between the pipe lower body 4" and the interval maintainer 2. The solution which flowed through the lower part does not soak through another aerial cultivating unit 1, but flows into the water collecting tub 8 and then is channeled to vessel 19.

Further, a reservoir of nutrient solution gathers on the upper part of the shielding bulkheads 7, 7'. This reservoir evaporates thus supplying moisture to the roots of the mother plant 30 held in cultivating unit 1', thereby preventing withering caused by dryness of the roots.

In comparison with conventional techniques in which the nutrient solution is supplied from an upper part and flows downward to other cultivating units, in the present invention a plurality of drip irrigators 13, 13' are used to supply the separate nutrient solution to the respective aerial cultivating units 1, 1'. That is, the nutrient solution supplied to one unit does not reach another unit. Thus, even if the mother plant 30 growing in one aerial cultivating unit 1 is infected by blight, the blight infection or any other water-borne infectious disease will not spread to another aerial cultivating unit 1' through the nutrient solution.

When a stem of the mother plant 30 grows and droops, an offspring plant can be produced from the stem. The seedling raising plate 14 is filled with soil as shown in FIG. 7 and is suspended vertically from cultivating unit 1. The stem from the mother plant 30 is directed into the soil bed of the seedling raising chamber and is irrigated with nutrient solution through the drip irrigators 13, 13'.

After a period of irrigation, a toot and bud will grow in the seedling rising chamber which can be transplanted after an appropriate period of growth Seedlings raised by the present method will be more resistant to blight, will take root readily, and will grow rapidly.

The cultivating units 1, 1' arc divided into a plurality of cultivation chambers. The seedling raising plate 14 is hung from these individual chambers. The number of cultivation chambers is thus greatly increased for a given cultivation area, In addition, a number of cultivation units can be stacked to further increase the capacity of the inventive device.

As shown in the following table showing a comparison between the inventive device and conventional techniques, the inventive device not only requires a raising-seedling cultivation area smaller than the conventional method of cultivating in the open field, but also can produce by about 17.2 times the number of the offspring trees with a smaller area.

|  | The present invention (two-stage accumulated layer) | Conventional technique (open field cultivation) | Remarks (comparison with conventions) |
| --- | --- | --- | --- |
| required seedling raising area | 100 p'yong (Korean unit) 330 sq. m. | 1,731 p'yong (Korean unit) 5.712 sq. m. | 5.9% area requirement |
| required mother plant number | 4,848 roots | 280 roots | 17.3 increase |
| offspring tree production number | 145,440 roots | 8,400 roots | 17.3 times increase |
| offspring trees formal required | 4,848 p'yong (Korean unit) 15,998 sq. m. | 280 p'yong (Korean unit) 924 sq. m. | 17.3 times increase |

Figure 4:
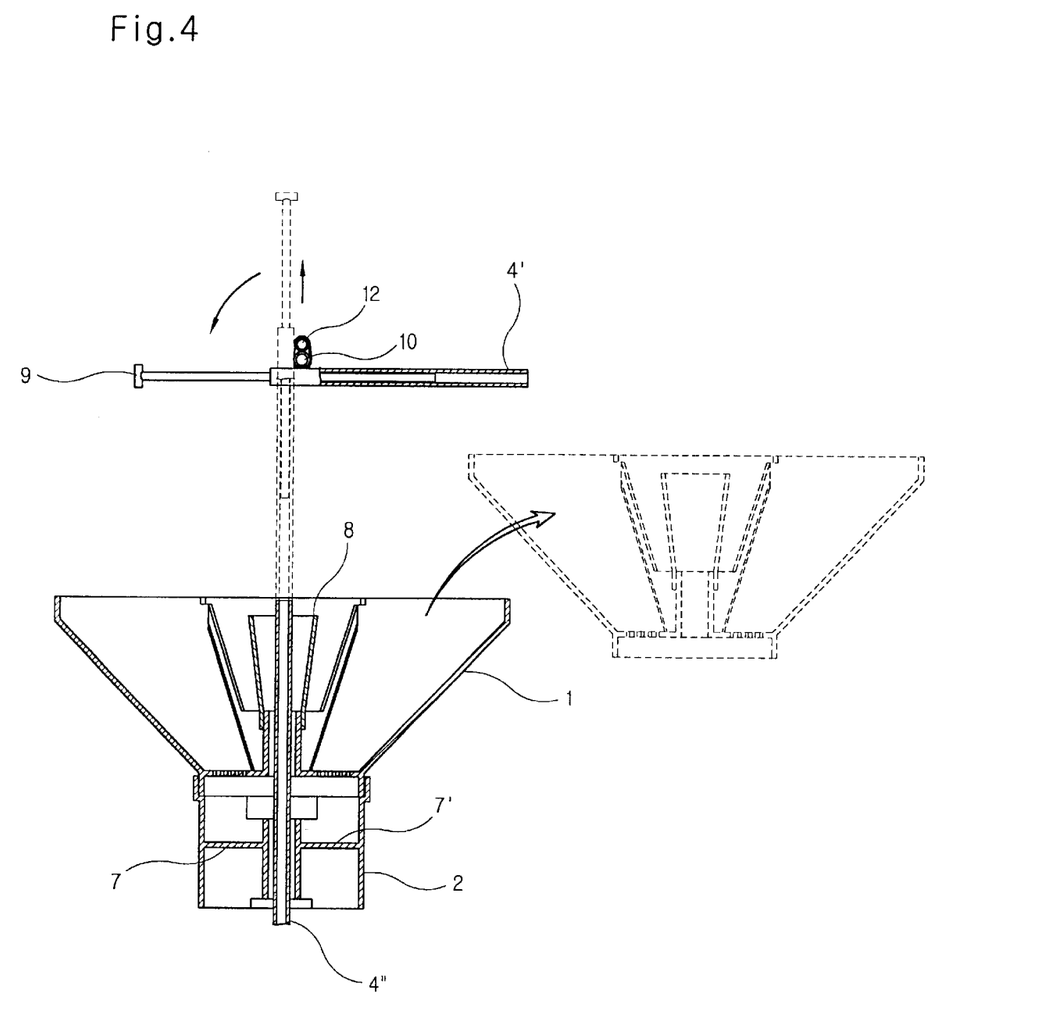
FIG. 4 offers an operational explanatory view for an attachment and detachment of a cultivating receptacle in the inventive seedling raising device.

As shown in FIG. 4, further, the aerial cultivating unit 1 can be separated from the seedling raising device after growth of the offspring plant, The seedling raising chambers con then be refilled with soil. The entire device need not be disassembled in order to remove the cultivating unit. Instead, the cultivating unit can be removed by first rotating the rotary support rod 9 in the direction of the arrow. This movement of the rotary support rod 9, which is attached to the pipe upper body 4' by means of clip 11, will then cause the pipe upper body 4' to disengage from the pipe lower body 4". The aerial cultivating unit can then be freely separated from the structure.

The ease of removal of the cultivating unit enables the ready replacement of the soil bed should the mother plant become infected The reassembly of the unit is similarly simplified. Lower pipe body 4" is inserted into the aerial cultivating unit 1; rotary support rod 9 and pipe upper body 4' are turned so that pipe upper body 4' can be contacted with pipe lower body 4".

The advantages of this invention is that the effective cultivation area is increased, thus increasing the number of offspring plants that can be raised in a limited cultivation area; and the provision of nutrient solution to mother plants separated from each other lessens the incidences of infection of blight and prevents the transmission of such infections between plants.

Although the invention has been shown and described with respect to the preferred embodiments, it will be understood by those skilled in the art that various changes and modifications may be made without departing from the spirit and scope of the invention as defined in the following claims.

What is claimed is:

1. A seedling raising device for an aerial seed cultivation of plants in a cultivating receptacle comprising an aerial cultivating unit, an interval maintainer, a rotary prop, and a pipe body inserted into the rotary prop, said device characterized in that:

a drainage pipe having two ends is inserted between the aerial cultivating unit and the rotary prop, where backing plates are attached to the ends of the drainage pipe such that the drainage pipe can be attached to the aerial cultivating unit and the rotary prop;

the interval maintainer having upper and lower part shielding bulkhead formed in the inside of said interval maintainer and a water collecting tub which is adapted to be inserted between the interval maintainer and the aerial cultivating unit;

a support pipe is fixed onto an upper part of the pipe body through use of a clip, and an irrigating hose is fixed to the support pipe, said irrigating hose having extending therefrom a plurality of drip irrigators; and a separate seedling raising plate is suspended from the aerial cultivating unit by a hook, and a vessel having a bent plate shape is installed under the rotary prop.

2. The device according to claim 1 wherein in one side face of said backing plate an inner and outer double jaw is formed and the drainage pipe is inserted therebetween, and in another side face of said backing plate a concave part is formed so that a lower part of the aerial cultivating unit is safely set thereinto.

3. The device according to claim 1 wherein said water collecting vessel is funnel shaped wherein a lower portion of said water collecting vessel has a plurality of insertion concave flutes.

4. The device according to claim 1 wherein said pipe body is divided into upper and lower bodies, wherein an upper end part of said upper body is adapted to receive a rotary support rod, one end of which extends further that the connected portion of the upper and lower bodies so that the pipe upper body is rotatable when the rotary support rod is lifted up and is rotated.

* * * * *